(12) United States Patent
Hoffmann

(10) Patent No.: US 10,091,304 B2
(45) Date of Patent: Oct. 2, 2018

(54) SGC AND PGC AND SGU AND PGU ALLOCATION PROCEDURE

(71) Applicant: NOKIA SOLUTIONS AND NETWORKS GMBH & CO. KG, Munich (DE)

(72) Inventor: Klaus Hoffmann, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 283 days.

(21) Appl. No.: 15/106,551

(22) PCT Filed: Dec. 20, 2013

(86) PCT No.: PCT/EP2013/077718
§ 371 (c)(1),
(2) Date: Jun. 20, 2016

(87) PCT Pub. No.: WO2015/090455
PCT Pub. Date: Jun. 25, 2015

(65) Prior Publication Data
US 2016/0337454 A1    Nov. 17, 2016

(51) Int. Cl.
G06F 15/16 (2006.01)
H04L 29/08 (2006.01)
H04W 76/10 (2018.01)
H04L 12/911 (2013.01)
H04W 76/12 (2018.01)

(52) U.S. Cl.
CPC ...... *H04L 67/141* (2013.01); *H04L 29/08576* (2013.01); *H04L 47/72* (2013.01); *H04L 47/781* (2013.01); *H04W 76/10* (2018.02); *H04W 76/12* (2018.02)

(58) Field of Classification Search
CPC ............... H04L 29/06319–29/06326; H04L 29/08576–29/08585; H04L 45/56; H04L 67/141; H04W 76/00–76/11
See application file for complete search history.

(56) References Cited

U.S. PATENT DOCUMENTS

2012/0300615 A1    11/2012  Kempf et al.
2013/0329601 A1*  12/2013  Yin ........................ H04L 45/02
                                                                          370/254
(Continued)

FOREIGN PATENT DOCUMENTS

WO    WO 2012/055446 A1    5/2012
WO    WO 2014/161572 A1   10/2014

OTHER PUBLICATIONS

International Search Report dated Apr. 16, 2014 corresponding to International Patent Application No. PCT/EP2013/077718.

(Continued)

*Primary Examiner* — Brendan Higa
(74) *Attorney, Agent, or Firm* — Squire Patton Boggs (US) LLP

(57) ABSTRACT

Apparatuses and methods are provided by which an apparatus (e.g., an MME) establishes a connection session in a network which involves a network resource (e.g., SGW) to be selected, and selects at least one of a control plane (e.g., SGW-C) and a user plane (e.g., SGW-U) of the network resource.

13 Claims, 4 Drawing Sheets

(56) References Cited

U.S. PATENT DOCUMENTS

| | | | | |
|---|---|---|---|---|
| 2014/0269269 | A1* | 9/2014 | Kovvali | H04W 24/08 370/229 |
| 2015/0009828 | A1* | 1/2015 | Murakami | H04L 47/2441 370/235 |
| 2016/0337914 | A1* | 11/2016 | Hoffmann | H04W 36/0083 |
| 2017/0142762 | A1* | 5/2017 | Kedalagudde | H04W 76/022 |

OTHER PUBLICATIONS

Christian Rothenberg, et al.; "Revisiting Routing Control Platforms with the Eyes and Muscles of Software-Defined Networking"; Hot Topics in Software defined Networks, ACM, XP058008057; pp. 13-18 (Aug. 13, 2012).

3GPP TS 23.401 V12.0.0 (Mar. 2013); 3rd Generation Partnership Project; Technical Specification Group Services and System Aspects; General Packet Radio Service (GPRS) enhancements for Evolved Universal Terrestrial Radio Access Network (E-UTRAN) access (Release 12).

3GPP TS 29.274 V12.3.0 (Dec. 2013); 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C);Stage 3 (Release 12).

3GPP TS 29.303 V11.2.0 (Sep. 2012); 3rd Generation Partnership Project; Technical Specification Group Core Network and Terminals; Domain Name System Procedures; Stage 3 (Release 11).

RFC 4655, A. Farrel, et al; "A Path Computation Element (PCE)—Based Architecture"; Network Working Group; Aug. 2006; 40 pages.

* cited by examiner

SGC AND PGC AND SGU AND PGU ALLOCATION PROCEDURE

FIELD OF THE INVENTION

The present invention relates to an apparatus and method such as a allocation procedure for user and control plane of network elements.

RELATED BACKGROUND ART

The following meanings for the abbreviations used in this specification apply:
3GPP 3$^{rd}$ Generation Partner Project
APN Access Point Name
BGP Border gateway protocol
CP control plane
DNS Domain Name Service
DP Data Plane
Forces Forwarding and control element separation
FP Forwarding Plane
FP forwarding plane
FTEID Fully Qualified TEID
IGP Interior gateway protocol
GPRS General Packet Radio Service
GTP-C GPRS Tunnelling Protocol-control plane
IP Internet protocol
IS-IS Inter System Inter system protocol
MME Mobility Management Entity
NAPTR Naming Authority Pointer
NE Network Element
OFC OpenFlow Controller
ONF Open Networking Foundation
OSPF Open Shortest Path First
PCC Patch Computation Client
PCE Path Computation Element
PCEP Path Computation Element communication Protocol
PGC PGW-C class
PGU PGW-U class
PGW Packet data network Gateway
PGW-C PGW control plane
PGW-U PGW user plane
PIP/InP physical infrastructure provider/infrastructure provider
SDN Software defined networks
SGC SGW-C class
SGU SGW-U class
SGW Signaling Gateway
SGW-C SGW control plane
SGW-U SGW user plane
TEID Tunnel Endpoint Identifier
ULI User Location Information
UP user plane
VNO Virtual Network Operator
VNP Virtual Network Provider
xGW Common abbreviation for SGW and PGW Embodiments of the present invention are related to virtual networks, such as software defined networking (SDN, for instance see ONF). In SDN, it is possible to separate control plane and user plane. However, currently selection processes for several kinds of network elements, such as SGW and PGW, assume the collocation of user plane and control plane. Hence, the advantages of SDN cannot be exploited.

Thus, in order to correctly select the according function in mobile broadband networks, new procedures are needed.

SUMMARY OF THE INVENTION

Embodiments of the present invention address this situation and aim to overcome the above-described problem and to provide a method, apparatus, and computer program product by means of which in a SDN environment network selection of network elements can be performed more flexibly.

According to a first aspect of the present invention . . . .

According to a first aspect of the present invention, a method is provided which comprises
  establishing a connection session in a network involving a network resource to be selected, and
  selecting at least one of a control plane and a user plane of the network resource.

According to a second aspect of the present invention, an apparatus is provided which comprises a memory, at least one network interface, and a processor configured to establish a connection session in a network involving a network resource to be selected, and to select at least one of a control plane and a user plane of the network resource.

The first and second aspects may be modified as follows:

The method may further comprise and/or the processor may be further configured to perform detecting whether a network resource to be selected is a non software defined network (SDN) based resource or is a software defined network based resource, wherein the process of selecting at least one of the control plane and the user plane is carried out for a software defined network based resource only.

A software defined network (SDN) based resource may be identified by a specific information element.

The method may further comprise and/or the processor may be further configured to perform accessing a network element (e.g., DNS or PCE) containing information regarding the network structure for obtaining information regarding the control plane and/or the user plane of the network resource to be selected. The network element may comprise a database (e.g., DNS) or an element configured to determine a path through the network (e.g., a PCE).

The other one of the control plane and the user plane of the network resource may be selected by a separate network element.

The method may further comprise and/or the processor may be further configured to perform selecting also the other of the control plane and the user plane of the network resource. In this case, the method may further comprise and/or the processor may be further configured to perform signaling identification information of the selected user plane of the network resource to the selected control plane of the network resource.

The method may further comprise and/or the processor may be further configured to perform performing the selection of the user plane based on implicit or explicit geographical area information and/or service related information. The geographical area information may comprise an identity of a network element providing network access involved in the connection session.

According to a third aspect of the present invention, a method is provided which comprises
  receiving a request for selecting a user plane of a network resource of which one of a control plane and a user plane has been allocated for establishing a connection session, and selecting the other one of the control plane and the user plane of the network resource based on the request.

According to a fourth aspect of the present invention, an apparatus is provided which comprises a memory, at least one network interface, and a processor configured to receive a request for selecting a user plane of a network resource of which one of a control plane and a user plane has been allocated for establishing a connection session, and to select the other one of the control plane and the user plane of the network resource based on the request.

The third and fourth aspects may be modified as follows:

The method may further comprise and/or the processor may be further configured to perform accessing a network element containing information regarding the network structure for obtaining information regarding the control plane and/or the user plane of the network resource to be selected. Optionally, the network element may comprise a database (e.g., a DNS) or an element configured to determine a path through the network (e.g., a PCE).

The method may further comprise and/or the processor may be further configured to perform performing the selection based on implicit or explicit geographical area information and/or service related information. The geographical area information may comprise identity of a network element providing network access and/or information regarding services involved in the connection session.

The method may further comprise and/or the processor may be further configured to perform receiving an identification of the other of the control plane and the user plane, wherein the selection is performed based on the received identification. Optionally, the identification may be received from the control plane of the network resource via a vertical control protocol.

Upon selecting, the user plane may be selected, wherein in this case the method may further comprise and/or the processor may be further configured to perform forwarding identification information of the selected user plane of the network resource to the control plane via a vertical control protocol.

The method and/or its modifications described above may be carried out by a network control element for configuring software defined networks, or the apparatus and/or its modifications may be or comprise such a network control element.

In this case the method may further comprise and/or the processor may be further configured to perform forwarding identification information of the selected control and/or user plane of the network resource to another network control element for configuring software defined networks via a horizontal control protocol.

According to a fifth aspect of the present invention, a method is provided which comprises
receiving a request for providing information regarding at least one of a control plane and a user plane of a network resource,
selecting the corresponding plane based on the request, and
sending information regarding the selected plane in response to the received request.

According to a sixth aspect of the present invention, an apparatus is provided which comprises a memory, at least one network interface, and a processor configured to receive a request for providing information regarding at least one of a control plane and a user plane of a network resource, to select the corresponding plane based on the request, and to send information regarding the selected plane in response to the received request.

The fifth and sixth aspects may be modified as follows:

The information may comprises an information element indicating whether a network resource to be selected is a non software defined network (SDN) based resource or is a software defined network based resource.

The request may comprise an identity of a network element providing network access and/or information regarding services involved in the connection session.

The method of the fifth aspect and/or its modifications may be carried out by a network element storing information regarding a plurality of network resources (e.g., a DNS), and/or may be carried out by a network element for calculating a network path (e.g., a PCE). The apparatus of the sixth aspect and/or its modifications may be or may be a part of a network element storing information regarding a plurality of network resources (e.g., a DNS), and/or a network element for calculating a network path (e.g., a PCE).

According to a seventh aspect of the present invention, a method is provided which comprises
receiving a request for setting up a connection session in a network, and
forwarding the request, wherein
the request comprises information for selecting at least one of a control plane and a user plane of a network resource involved in the connection session, and the method is carried out by one of the control plane and the user plane of the network resource.

According to an eighth aspect of the present invention, an apparatus is provided which comprises a memory, at least one network interface, and a processor configured to receive a request for setting up a connection session in a network, and to forward the request, wherein the request comprises information for selecting at least one of a control plane and a user plane of a network resource involved in the connection session, and wherein the apparatus is or is part one of the control plane and the user plane of the network resource.

The seventh and eighth aspects may be modified as follows:

The method may be carried out by the control plane of the network resource or the apparatus may be the control plane of the network resource, and the request may comprise identification information of a network element and/or information regarding services involved in the connection session, wherein the method may further comprise and/or the processor may be further configured to perform forwarding the request including the identification information of a network element (e.g., eNB ID) and/or information regarding services (e.g., APN) involved in the connection session to a network controller via a vertical control protocol.

Furthermore, the method may further comprise and/or the processor may be further configured to perform receiving identification information of the selected user plane of the network resource via a vertical control protocol.

It is to be understood that any of the above modifications can be applied singly or in combination to the respective aspects and/or embodiments to which they refer, unless they are explicitly stated as excluding alternatives.

According to a ninth aspect of the present invention, a computer program product is provided which comprises code means for performing a method as defined by any one of the above described first, third, fifth and seventh aspects and/or their modifications when run on a processing means or module. The computer program product may be embodied on a computer-readable medium.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

Figure 1:
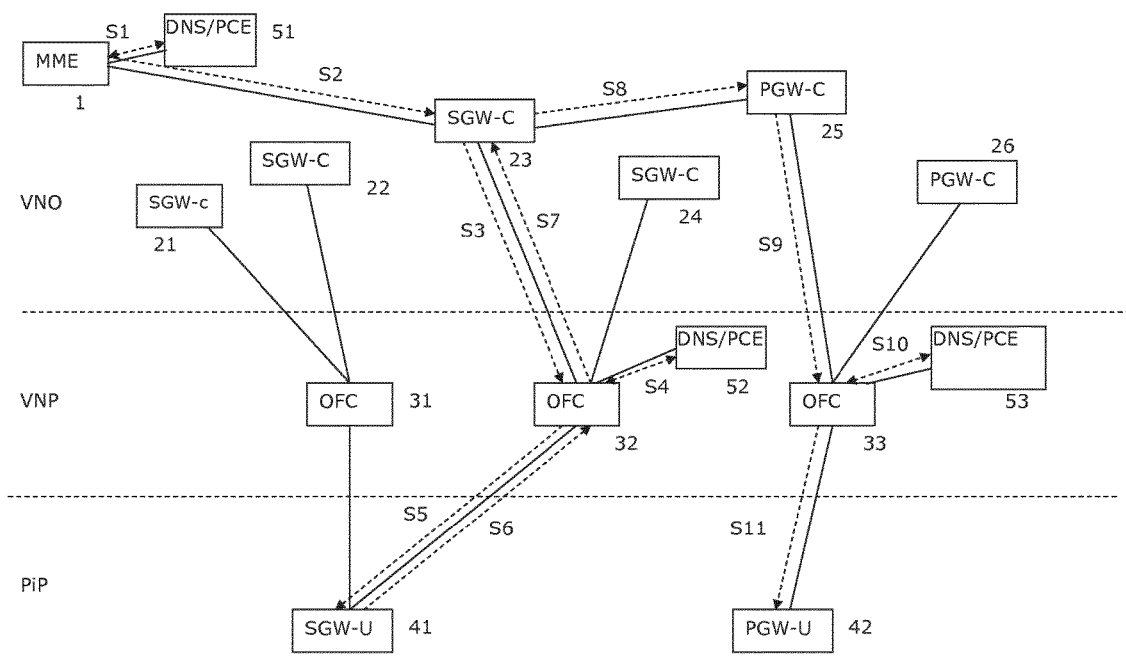
FIG. 1 shows a network arrangement and a signaling flow according to a first embodiment of the present invention, FIG. 2 reproduces FIG. 2 of RFC 4655, and FIGS. 3A and B show block circuit diagrams illustrating configurations of a MME, an OFC, an DNS/PCE and a xGW-C/U to which examples of embodiments of the invention are implementable.

In the following, description will be made to embodiments of the present invention. It is to be understood, however, that the description is given by way of example only, and that the described embodiments are by no means to be understood as limiting the present invention thereto.

As already mentioned above, SDN requires the separation of control plane and user/data/forwarding plane. Currently the SGW and PGW selection procedures assume the collocation of User and Control plane. Therefore, in SDN environment, new procedures are necessary in order to correctly and/or efficiently select the according function in mobile broadband networks. Also in fixed networks where e.g. a BRAS (Broadband Access Server, which also consists of a control and a user plane), is utilized, the same mechanism/method can be applied. So even in the FMC (Fixe Mobile Convergence) scenario this is of help in particular.

Furthermore, it can be observed increasingly that currently existing SGWs and PGWs are internally not well load balanced with regard to the ratio of signaling and user plane traffic due to the nature of the upcoming services which deviate from the preconfigured internal hardware ratio for the control plane and user plane processing units. For instance, the existing SGWs are optimized for a particular traffic matrix, i.e., for a particular ratio between control (signaling) plane traffic and user plane traffic. However, if the current traffic is deviating from that anticipated hardware ratio, the corresponding processing units are not fully utilized, while other parts are highly loaded, or vice versa.

Hence, according to embodiments of the present invention, the selection of SGWs and PGWs is separated for control plane (C-Plane) and user plane (U-Plane). That is, the resources on the control plane and the user plane can be allocated according to the need.

Selection of SGW and PGW are described in 3GPP TS 23.401 and 3GPP TS 29.303, for example. In particular, 3GPP TS 29.303 relies on DNS and NAPTR records for selection of SGW and PGW.

Thus, in particular when applying SDN, the above-described problem can be solved, by changing the current way of selecting SGW and PGW. For example, according to 3GPP TS 29.303 network elements are indicated by "topon" (topology on) and "topoff" (topoff). Topon means that the network element to be selected (e.g., a SGW) should be as close as possible to another network element (e.g., a PGW). That is, here the topology of the network is considered.

According to an embodiment of the present invention, this existing topon/topoff indication is valid for the signaling plane (SGW-C and PGW-C). The User plane is to be considered in a next step (possibly again based on DNS mechanisms). The order of the allocation process may be in a reversed order, e.g. allocate at first the user plane and then the control plane. This is especially feasible in case the MME (or any appropriate entity) performs both steps, then it could be in the reversed order. And there might several combinations how to achieve this. A DNS query to request the user plane part at first and in the second step another DNS request for allocating the control plane or vice versa. Or one may rely on the PCE at first and then on the DNS, for example.

The MME (selecting the SGW and the PGW) needs to know for each SGW and PGW as to whether they are legacy entities or SDN like entities.

a) This can be achieved by introducing a new class of elements SGC and PGC in DNS NAPTR records (SDN like architecture).

With this, the DNS procedure will be able to differentiate between the old existing DNS procedure and the new one for the SDN based network elements. If two conventional NE are involved the existing procedure is performed at the MME with traffic rations which are in line with the known hardware capacity and ration of the legacy equipment. If at least one (/or all) SDN based control (SGW-C or PGW-C) NE is involved in the selection process, the selection process may, depending on the APN and configuration, flexibly prefer the selection of SDN based GW-Cs for services, which don't fit into the known ratio of signaling traffic to user traffic of existing legacy SGW/PGW, such that the needed traffic matrix can be matched with the SDN architecture.

It is noted that SDN is defined by separating the control plane from the user plane regardless where the user plane or the control may reside. Therefore, according to the present embodiment, the new information element is introduced which indicates/allows to recognize whether a particular function (SGW or PGW or BRAS or whatever) adheres to SDN or not. Depending on this information the MME (or another suitable network element) will decide to follow legacy selection process or to follow the new selection process. For that the DNS protocol or the PCEP carries an indication (implicit or explicit) that a particular function (SGW, PGW or BRAS) adheres to SDN or not. It might even possible that the SGW may be SDN based, but the PGW not, or vice versa.

b) Furthermore, the new selection procedure at the MME is introduced, namely that in a first step, only the C-Plane (SGW-C or PGW-C) is selected, as described above.

c) After the SGW-C (SGC) and PGW-C (PGC) had been selected in the first step, the selection of U-Plane entities is performed in a second step, and is preferably performed by the e.g. OFC (but could also be the SGW-C or the PGW-C part). According to the present embodiment, this selection is a DNS based solution like in the TS 29.303, i.e., as described above in connection with the selection of the C-Plane.

That is, once the new SGW-C and PGW-C have been selected, the C plane applications apply for the OFC (OF Controller, OpenFlow Controller) for the allocation of the User plane entities by taking into account the eNB Identity of the UE in question. According to the present embodiment, the SGW-C application connected to the OFC signals the eNB ID area to the OFC. Depending on this and preferably also on the to be accompanied APN/Services the second stage OFC DNS procedure is suggested to allocate the corresponding SGW-U (User plane NE (load balancing, service depending, etc)).

It is noted that the eNB ID relates to the geographical area of the eNB.

The C plane applications apply for the OF Controller for the allocation of the User plane entities by taking into account the eNB Identity and the APN of the UE bearer in question. As such the SGW-C application connected to the OFC (OpenFlow Controller) is suggested to signal the eNB ID to the OFC. Depending on this and preferably also on the to be accompanied APN/Services the second stage OFC DNS procedure is suggested to allocate the corresponding User plane NE (load balancing, service depending, etc).

Thus, the SGW-C part would either be responsible for the allocation of the plain TEID or the SGW-U itself may allocate the TEID instead, whereas the SGW-U procedure for requesting the particular User part network element (for instance defined by the IP Address) is performed by the OFC. The TEID allocated by the SGW-C and the IP address allocated by the OFC form the FTEID (fully qualified TEID).

Then, after successful allocation of the FTEID of the SGW-U, the IDs are forwarded from the SGW-C to the PGW-C via the GTP-C Create Session request. Again the PGW-C may or may not select the TEID for the PGW-U and hands down the APN to the OFC, which may selects the IP address of the PGW-U. Furthermore, the FTEID of the SGW-U are handed down to the OFC of the PGW-C, which in turn can again select the U-Plane of the PGW based on the APN/Service and the FTEID of the SGW-U.

A simple architecture and a sequence flow are shown in FIG. 1. In particular, different network elements (virtual and legacy) and their connections are indicated by solid lines whereas the sequence flow is indicated by dotted lines.

In particular, reference sign 1 denotes an MME. Reference signs 21 to 24 denote SGW-C, i.e., control planes of SGWs or resources which can be operated as SGW-C. Reference signs 25 and 26 denote PGW-C, i.e., control planes of PGWs, or resources which can be operated as PGW-C. The elements 21 to 26 may be provided by a virtual network operator (VNO).

Reference numerals 31 to 33 indicate OFCs, i.e., open flow controllers. These elements may be provided by a virtual network provider (VNP).

Reference numeral 41 denotes a SGW-U, and reference numeral 42 denotes a PGW-U.

Reference numerals 51 to 53 describe DNS, which, according to an alternative embodiment described below, may also be PCEs.

In the following, the signaling flow is described. First, the MME 1 accesses a DNS in S1 in order to obtain information regarding the SGW-C and the PGW-C to be selected. As mentioned above, on this occasion the MME 1 checks whether the SGW is virtualized, i.e., whether the SGW has separated control and user planes, as it is shown in the example in FIG. 1. In this example, the MME receives the address of SGW-C 23 and sends a message in S2 to the SGW-C, by using GTP-C, for example (tunnel protocol for the control plane).

In response to S2, the SGW-C 23 forwards a message to the OFC 32 in S3 (containing the eNB ID and the APN), so that the OFC 32 will select a corresponding SGW-U. This is effected by accessing a DNS in S4. Thus, the OFC sends a message to the selected SGW-U (SGW-U 41) in S5, and receives a response in S6. As described above, a tunnel is (twill be) established by using the FTEID of the SGW-U. Here, the FTEID is an example for the identity of the SGW-U, i.e., the SGW-U ID. This is acknowledged by sending a message from the OFC 32 to the SGW-C in S7.

In S8, the IDs are forwarded from the SGW-C 23 to the PGW-C 25. The PGW-C 25 was selected by the MME in S1. The FTEID of the SGW-U 23 is forwarded to the OFC of the PGW-C 25, namely to OFC 33 in S9. The OFC 33 then selects the PGW-U by referring to a DNS, as indicated by S10. Finally, the OFC 33 sends a message to the selected PGW-U.

In this way, the control and user planes of the elements involved (SGW and PGW) can be selected independently based on the required service and the location of the eNB (because of an implicit correlation between ID and location).

Furthermore, according to the present embodiment, the so-called northbound interface is enhanced with eNB Identity (already signalled in the ULI of GTP-C, see TS 29274) and the APN. The northbound interface is the interface between SGW-C and OFC. That is, in the example shown in FIG. 1, the message S3 contains the eNB identity and APN.

Hence, according to the embodiment described above, the interface (in this example based on OpenFlow) between SGW-C and OFC are enhanced with the eNB ID or the ID of the SGW-U. Moreover, the interface to DNS is either enhanced with the indication that the address of xGW-U is requested (like in the above example if done by the OFC) or that the xGW-C ID is requested by the OFC in case the existing DNS mechanism is misused to allocate the xGW-U ID (different to the above example) by the MME.

That is, that there is an (open Northbound (NB) interface between the Application (xGW-C and the (so called) OFC and which is able to carry at least the APN and the eNB ID (or something similar) on one hand side if the OFC has to determine the SGW-U or on the other side the NB (Northbound) is able to carry the IDs of the xGW-U if already determined by the MME. This especially means in the latter case, that these xGW-U IDs need to be signaled from the MME to the SGW-C and from there to the PGW-C, but which is currently not possible in the existing GTP-C protocol (as defined in 3GPP TS 29274 Create session request, for example).

According to an alternative embodiment, the MME may perform the allocation of the user Plane already in the first DNS step. It may consult the OF controllers (responsible for the selected SGW-C and one responsible for the selected PGW) in the second step. In this case, the MME needs to know the address of the OFCs for SGW-C and/or the PGW-C by some pre-Configuration. Alternatively the MME may consult the/its DNS again, but requesting the User plane for the SGW-C and/or the PGW-C in question. In any case it is suggested that the MME sends the two IDs of the selected U-plane NEs via the GTP-C (3GPP 29274) towards the SGW-C and PGW-C.

That is, according to this embodiment, the signaling flow of FIG. 1 is modified such that in S1 also information regarding SGW-U and PGW-U (e.g., IDs of the SGW-U and PGW-U) are obtained from the DNS, and in S2, this information is also sent to SGW-C and PGW-C, so that the corresponding OFC 32 and 33 do not have to perform the selection procedures. Hence, S4 and S10 are omitted.

That is, according to this embodiment, an explicit and independent selection of both planes is possible.

According to a further embodiment of the present invention, the OFC consults an augmented PCE (path computation element) which calculates the corresponding U-Plane network element.

The advantage of using a PCE is that the PCE in general can provide "realtime" view about the availability and status (like e.g. capacity, overload or so) of the resources if continuously fed via OSPF (or similar like BGP), etc.

PCE is defined in RFC 4655. According to FIGS. 1 and 2 of the RFC 4655 the PCE in general is updated with the location and the availability (etc.) of (transport) resources via a IGP (Interior gateway protocol like for instance the OSPF and/or IS-IS protocol) in order to calculate transport path. These paths are requested via the PCEP (PCE Protocol) from a PCC (path computation client).

However, according to the present embodiment, the MME or the OFC (as a PCC) may request the calculation of the user plane and/or control plane resources, which of course would also would have been to be fed by the enhanced OSPF protocol.

Figure 2:
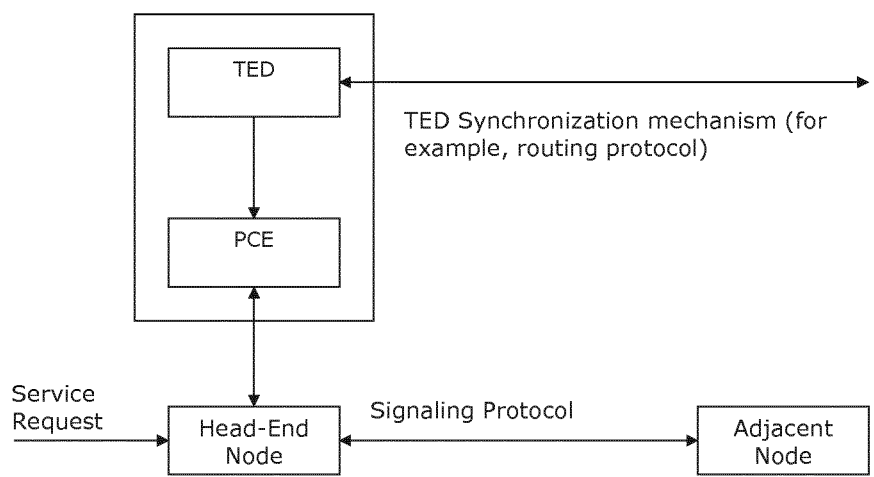

FIG. 2 reproduces FIG. 2 of RFC 4655. Based on this figure, the Service request would be the "initial attach" message from the UE sent via the eNB to the MME. The MME acting as a PCC turns to the PCE for the information (at least the IP adress of the resource) about the resource (SGW, PGW, o U or C are or both as valid for the network in question etc). Then the MME sends the GTP-C message Create Session request to the SGW-C (in FIG. 3 denoted via the "signalling" interface). The so called routing protocol (e.g. OSPF) which is also to be enhanced with the information about the SGW-U and/or SGW-C and PGW-U and/or PGW-C such that the TED (Traffic engineering database) holds information about the address (e.g. IP address) of the resources available for the selection process.

That is, according to this embodiment, the signaling flow of FIG. 1 is modified such that in S4 and/or S10, the OFC 32 and/or 33 access the PCE instead of the DNS in order to obtain the necessary information, i.e., the Ids of the SGW-U and/or PGW-U.

As a further modification, also the MME may access the PCE. That, is in case the MME also performs the selection of the SGW-U and the PGW-U, the MME may access the PCE.

Figure 3A:
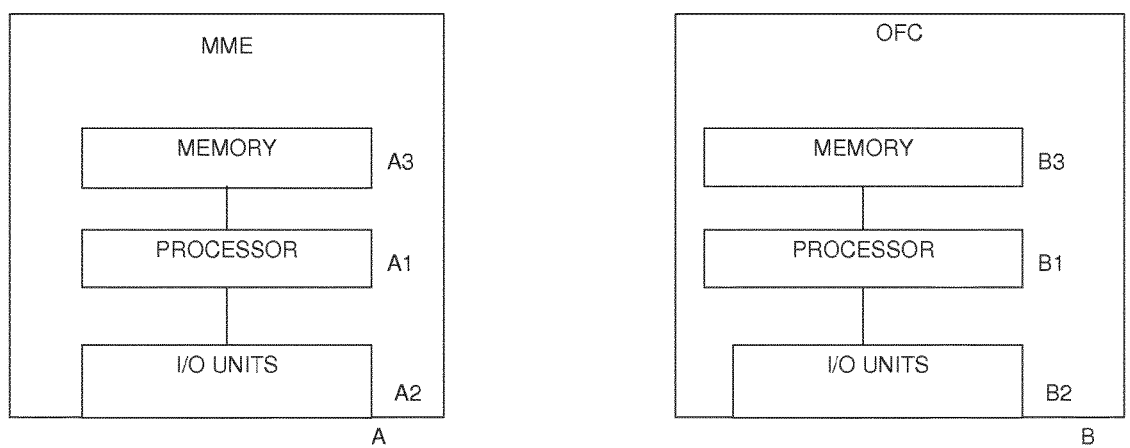
Figure 3B:
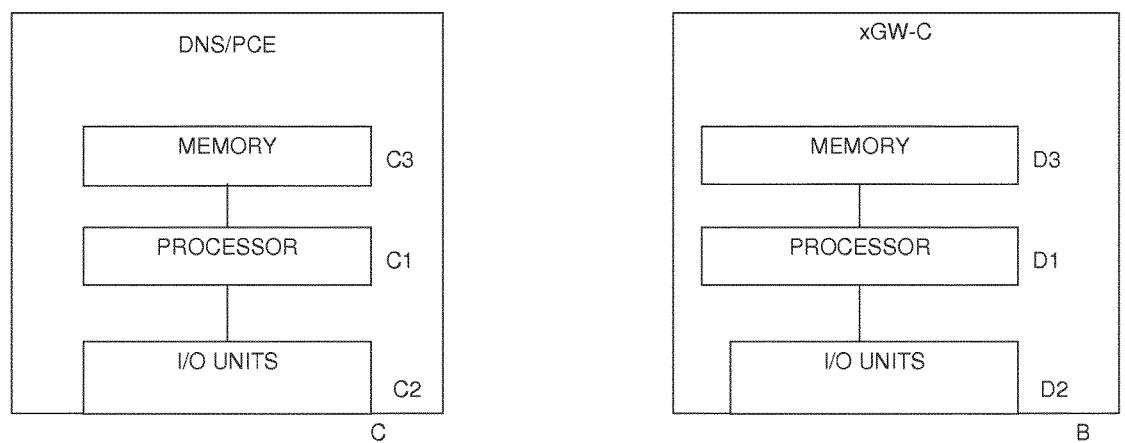

In the following, some general embodiments of the present invention is described by referring to FIGS. 3A and 3B. In particular, FIGS. 3A and 3B show several network elements involved in procedures according to embodiments of the present invention. In more detail, FIG. 3A shows an MME A and an OFC B, and FIG. 3B shows a DNS/PCE C and a xGW-C/u D. The MME A shown in FIG. 3A may be the MME 1 shown in FIG. 1, and the OFC B may be one of the OFCs 31 to 33 shown in FIG. 1, depending on which SGW-C has been selected.

It is however noted that that MME, OFC, DNS/PCE and xGW-C/u are only examples for corresponding network elements which carry out corresponding functions.

It is to be noted that the network elements A, B, C and D shown in FIGS. 3A and 3B may comprise several further elements or functions besides those described in connection therewith but which are omitted herein for the sake of simplicity as they are not essential for understanding the invention.

The MME A comprises a processing function or processor A1, such as a CPU or the like, which executes instructions given by programs or the like. The processor A1 may comprise further portions dedicated to specific processings as described below. Portions for executing such specific processings may be also provided as discrete elements or within one or more further processors, for example. Reference sign A2 denotes transceivers or input/output (I/O) units connected to the processor A1. The I/O units A2 may be used for communicating with other network elements or functions, such as other elements as shown in FIG. 1, for example. Reference sign A3 denotes a memory usable, for example, for storing data and programs to be executed by the processor A1 and/or as a working storage of the processor A1.

The processor A1 is configured to establish a connection session in a network involving a network resource (e.g., SGW, PGW) to be selected, and to select at least one of a control plane and a user plane of the network resource.

According to certain embodiments, MME has at least a modified DNS/PCE interface (as one of the I/O units A2), and according to the above embodiment in which also the U-Plane is selected, the MME also comprises a modified GTP-C interface with xGW-U Ids.

Similar as the MME A, the OFC B comprises a processing function or processor B1, such as a CPU or the like, which executes instructions given by programs or the like. The OFC is an example for a network control element for configuring software defined networks (SDN). The processor B1 may comprise further portions dedicated to specific processings as described below. Portions for executing such specific processings may be also provided as discrete elements or within one or more further processors, for example. Reference sign B2 denotes transceivers or input/output (I/O) units connected to the processor B1. The I/O units B2 may be used for communicating with other network elements or functions, such as elements shown in FIG. 1, for example. Reference sign B3 denotes a memory usable, for example, for storing data and programs to be executed by the processor B1 and/or as a working storage of the processor B1.

The processor B1 is configured to receive a request for selecting a user plane of a network resource of which one of a control plane and a user plane has been allocated for establishing a connection session, and to select the other one of the control plane and the user plane of the network resource based on the request.

The OFC may have access to the SGW-C (or the PGW-C) (i.e. in general an xGW-C) via Northbound interface, to the DNS (or PCE) and to the SGW-U (or to PGW-U). In the example described above in connection with FIG. 1, the OFC has access to the xGW-C via Northbound interface, namely in S3, S7 and S9. Moreover, the OFC has access to the DNS (or PCE) via an interface in S4 and S10 and to the SGW-U via an interface in S5 and S6 (or to PGW-U via an interface in S11).

The GTP-C interface described above is an example for a horizontal interface (an interface via which a horizontal control protocol is exchanged), i.e., an interface between entities on the same hierarchical level. The northbound interface (like the southbound e.g. OpenFlow/Forces) is an example for a vertical interface (an interface via which a vertical control protocol is exchanged), i.e., an interface between entities on different hierarchical levels.

Similar as above, the DNS/PCE C comprises a processing function or processor C1, such as a CPU or the like, which executes instructions given by programs or the like. The processor C1 may comprise further portions dedicated to specific processings as described below. Portions for executing such specific processings may be also provided as discrete elements or within one or more further processors, for example. Reference sign C2 denotes transceivers or input/output (I/O) units connected to the processor C1. The I/O units C2 may be used for communicating with other network elements or functions, such as elements shown in FIG. 1, for example. Reference sign C3 denotes a memory usable, for example, for storing data and programs to be executed by the processor C1 and/or as a working storage of the processor C1.

The processor C1 is configured to receive a request for providing information regarding at least one of a control plane and a user plane of a network resource, to select the corresponding plane based on the request, and to send information regarding the selected plane in response to the received request.

It is noted that network element C may be either a DNS or a PCE.

That is, when according to the embodiment when the network element is a DNS, the DNS has at least a modified DNS interface (I/O unit C2) e.g. because the DNS shall return to the MME that the xGW resource in question is for instance SDN based or not (legacy). In case one is SDN based at least another query is needed either by the MME itself or by the OFC later on. In case both resources are legacy the MME just continues as today.

In case of a PCE, the PCE may have a modified PCEP interface, The TED of the PCE may be fed by an enhanced OSPF (i.e. SGW-C, SGW-U etc).

Furthermore, the xGW-C/u D comprises a processing function or processor D1, such as a CPU or the like, which executes instructions given by programs or the like. The processor D1 may comprise further portions dedicated to specific processings as described below.

Portions for executing such specific processings may be also provided as discrete elements or within one or more further processors, for example. Reference sign D2 denotes transceivers or input/output (I/O) units connected to the processor D1. The I/O units D2 may be used for communicating with other network elements or functions, such as elements shown in FIG. 1, for example. Reference sign D3 denotes a memory usable, for example, for storing data and programs to be executed by the processor D1 and/or as a working storage of the processor D1.

The processor D1 is configured to receive a request for setting up a connection session in a network, and to forward the request, wherein the request comprises information for selecting at least one of a control plane and a user plane of a network resource involved in the connection session, and the method is carried out by one of the control plane and the user plane of the network resource.

It is noted that the xGW-C/u can be any of a SGW-U, SGW-C, PGW-U and PGW-C and is only an example for a network element which comprises separate control and user planes.

The possible connections of the xGW are described in the following by referring to the example of FIG. 1. The SGW-C may have a GTP-C interface, (e.g. in S2, S8) and a Northbound (OpenFlow) interface (e.g., in S3, S7). The PGW-C may have the GTP-C interface (e.g. in S8) and the Northbound (OpenFlow) (e.g., in S9). The SGW-U may have a Southbound (OpenFlow) interface (e.g. in S5, S6), and the PGW-U may have the Southbound (OpenFlow) interface (e.g. in S11).

Thus, according to several embodiments of the present invention, it is possible to separately select or allocate a control plane of a network resource (e.g., SGW-C or PGW-C) separately from a selection or allocation of the user plane of the network resource (e.g., SGW-U or PGW-U). The selection can be performed by different network elements (as shown above in connection with FIG. 1) or by the same network element (e.g., by the MME). Therefore, in particular the resources on the user plane can be allocated by taking into account the actual need, i.e., based on the service etc.

It is noted that the embodiments and the present invention in general is not limited to the specific examples given above.

For example, in certain embodiments it was described that the OFC has a vertical interface, e.g., communicates with a corresponding SGW-C (as indicated by S3 and S7 in FIG. 1, for example) or a corresponding SGW-U (as indicated by S5 and S6 in FIG. 1, for example), or with corresponding PGW-C or PGW-U (as indicated by S9 and S11 in FIG. 1, for example). However, alternatively also the OFC may have a horizontal interface. In the example of FIG. 1, there could be an interface between OFC 32 and OFC 33. By using this interface, the two OFCs involved can also exchange necessary information, for example regarding a selected SGW-U and/or PGW-U and the like.

The OFC-OFC interface could be realized also by an indirect interface via PCE. Namely, for example according to RFC 4655, FIG. 4, section 5.4, a horizontal interface for PCEs is already defined, and, as also indicated in FIG. 1 by S4 and S10, the OFCs 32 and 33 have access to the corresponding PCEs.

This structure can be advantageous in particular in case of roaming, which is a case where the SGW and PGW belong to two independent separated operators. In that case the two OFCs probably will not have access to the one DNS/PCE owned by one and the same operator. Consequently the OFC for the SGW of the first operator may need (implicit or explicit) access to information from the OFC for the user plane of the PGW owned by the other operator in order to provide an optimized ete allocation (from bandwidth and delay perspective, and etc) even across operator boundaries by means of PCE (PCEP). This can be effected via a direct or indirect OFC-OFC interface as described above.

Furthermore, in the example shown in FIG. 1, different DNS (or PCE) are provided to which the different network elements such as the MME 1, OFC 32 and OFC 33 have access. However, it is also possible that for the whole network only a single or a limited number of DNS (or PCE) are provided, so that at least some of the network elements access the same DNS (or PCE).

It is noted that the term "control plane" relates to a control and/or signaling part of a network resource in general, and the term "user plane" relates to parts such as user/data/forwarding planes in general.

According to a further aspect of embodiments of the present invention, an apparatus is provided which comprises
  means for establishing a connection session in a network involving a network resource to be selected, and
  means for selecting at least one of a control plane and a user plane of the network resource.

According to another aspect of embodiments of the present invention, an apparatus is provided which comprises
  means for receiving a request for selecting a user plane of a network resource of which one of a control plane and a user plane has been allocated for establishing a connection session, and
  means for selecting the other one of the control plane and the user plane of the network resource based on the request.

According to a still further aspect of embodiments of the present invention, an apparatus is provided which comprises
  means for receiving a request for providing information regarding at least one of a control plane and a user plane of a network resource,
  means for selecting the corresponding plane based on the request, and
  means for sending information regarding the selected plane in response to the received request.

According to a further aspect of embodiments of the present invention, an apparatus is provided which comprises
  means for receiving a request for setting up a connection session in a network, and
  means for forwarding the request, wherein
  the request comprises information for selecting at least one of a control plane and a user plane of a network resource involved in the connection session, and the method is carried out by one of the control plane and the user plane of the network resource.

It is to be understood that any of the above modifications can be applied singly or in combination to the respective aspects and/or embodiments to which they refer, unless they are explicitly stated as excluding alternatives.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines (DSL, Fibre, etc) but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (station) may be any device, apparatus, unit or means by which a system user or subscriber may experience services from an access network, such as a mobile phone or smart phone, a personal digital assistant PDA or Tablet, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B, MME, DNS, PCE, OFC, xSGW-C xSGW-U etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. A method comprising
establishing a connection session in a network involving a network resource to be selected
detecting when the network resource to be selected is a non software defined network based resource or a software defined network based resource, and
selecting a control plane or a user plane of the network resource for a software defined network based resource only.

2. The method according to claim 1, wherein a software defined network based resource is identified by a specific information element.

3. The method according to claim 1, further comprising accessing a network element containing information regarding the network structure for obtaining information regarding the control plane and/or the user plane of the network resource to be selected.

4. The method according to claim 1, wherein the other one of the control plane and the user plane of the network resource is selected by a separate network element.

5. The method according to claim 1, further comprising selecting also the other of the control plane and the user plane of the network resource.

6. The method according to claim 5, further comprising signaling identification information of the selected user plane of the network resource to the selected control plane of the network resource.

7. An apparatus comprising
a memory,
at least one network interface, and
a processor configured
to establish a connection session in a network involving a network resource to be selected, to detect when the network resource to be selected is a non software defined network based resource or a software defined network based resource, and to select a control plane or a user plane of the network resource for a software defined network based resource only.

8. The apparatus according to claim 7, wherein a software defined network based resource is identified by a specific information element.

9. The apparatus according to claim 7, wherein the processor is further configured to access a network element containing information regarding the network structure for obtaining information regarding the control plane and/or the user plane of the network resource to be selected.

10. The apparatus according to claim 7, wherein the other one of the control plane and the user plane of the network resource is selected by a separate network element.

11. The apparatus according to claim 7, wherein the processor is further configured to select also the other of the control plane and the user plane of the network resource.

12. The apparatus according to claim 11, wherein the processor is further configured to signal identification information of the selected user plane of the network resource to the selected control plane of the network resource.

13. A computer program product embodied on a non-transitory computer-readable medium, said product comprising code means for performing a method according to claim 1 when run on a processing means or module.

* * * * *